United States Patent
Wengreen et al.

(10) Patent No.: US 9,429,947 B1
(45) Date of Patent: Aug. 30, 2016

(54) SELF-DRIVING VEHICLE SYSTEMS AND METHODS

(71) Applicants: Eric John Wengreen, Sammamish, WA (US); Wesley Edward Schwie, Bala Cynwyd, PA (US)

(72) Inventors: Eric John Wengreen, Sammamish, WA (US); Wesley Edward Schwie, Bala Cynwyd, PA (US)

( * ) Notice: Subject to any disclaimer, the term of this patent is extended or adjusted under 35 U.S.C. 154(b) by 0 days.

(21) Appl. No.: 15/099,565

(22) Filed: Apr. 14, 2016

(51) Int. Cl.
| | |
|---|---|
| *G05D 29/00* | (2006.01) |
| *B60W 50/08* | (2012.01) |
| *G05D 1/00* | (2006.01) |
| *B60Q 5/00* | (2006.01) |
| *B60Q 1/50* | (2006.01) |
| *G10L 17/22* | (2013.01) |
| *G10L 15/22* | (2006.01) |

(52) U.S. Cl.
CPC ............... *G05D 1/0088* (2013.01); *B60Q 1/50* (2013.01); *B60Q 5/00* (2013.01); *G10L 17/22* (2013.01); *G10L 2015/223* (2013.01)

(58) Field of Classification Search
CPC ........... B60W 2550/40; B60W 30/12; B60W 10/20; G06Q 20/327; G05D 1/0011; G05D 1/0088; G08G 1/00
See application file for complete search history.

(56) References Cited

U.S. PATENT DOCUMENTS

| | | | |
|---|---|---|---|
| 7,698,078 B2 | 4/2010 | Kelty | |
| 8,180,379 B2 | 5/2012 | Forstall | |
| 8,634,980 B1 | 1/2014 | Urmson | |
| 8,700,251 B1 | 4/2014 | Zhu | |
| 8,849,494 B1 * | 9/2014 | Herbach | B60W 30/00 701/24 |
| 8,874,305 B2 | 10/2014 | Dolgov | |
| 8,949,016 B1 | 2/2015 | Ferguson | |
| 8,954,217 B1 | 2/2015 | Montemerlo | |
| 8,954,252 B1 | 2/2015 | Urmson | |
| 8,965,621 B1 | 2/2015 | Urmson | |
| 8,996,224 B1 * | 3/2015 | Herbach | G05D 1/0011 180/116 |
| 9,008,890 B1 * | 4/2015 | Herbach | B60W 30/00 340/435 |
| 9,026,300 B2 | 5/2015 | Ferguson | |
| 9,120,484 B1 | 9/2015 | Ferguson | |
| 9,120,485 B1 | 9/2015 | Dolgov | |
| 9,194,168 B1 | 11/2015 | Lu | |
| 2009/0287367 A1 * | 11/2009 | Salinger | G05D 1/0246 701/23 |
| 2012/0009845 A1 * | 1/2012 | Schmelzer | A63H 17/00 446/431 |
| 2012/0083960 A1 * | 4/2012 | Zhu | G05D 1/0214 701/23 |
| 2013/0197674 A1 | 8/2013 | Lowry | |
| 2014/0336935 A1 | 11/2014 | Zhu | |
| 2014/0350855 A1 | 11/2014 | Vishnuvajhala | |
| 2015/0088421 A1 | 3/2015 | Foster | |
| 2015/0295949 A1 * | 10/2015 | Chizeck | H04L 12/12 726/23 |

OTHER PUBLICATIONS

Google Self-Driving Vehicle—Online prior to Apr. 13, 2016 at www.google.com/selfdrivingcar/.

(Continued)

*Primary Examiner* — Mussa A Shaawat

(57) ABSTRACT

Although self-driving vehicles excel under "normal" driving conditions, they sometimes struggle with new situations that often would not be overly difficult for a person. Several embodiments described herein enable a hybrid approach that leverages the exceptional abilities of self-driving vehicles while soliciting human interaction in select situations. The resulting combination of machine intelligence and human intelligence significantly enlarges the potential of self-driving vehicles in a manner that will enable self-driving vehicles to become widespread much faster than would otherwise be the case.

28 Claims, 5 Drawing Sheets

(56) References Cited

OTHER PUBLICATIONS

Testa Autopilot—Online prior to Apr. 13, 2016 at www.technologyreview.com/s/600772/10-breakthroug-technologies-2016-tesla-autopilot/.

Tesla Model S Software Version 7—Autopilot—Online prior to Apr. 13, 2016 at www.teslamotors.com/presskit/autopilot.

BMW Heads Up Display—Online prior to Apr. 13, 2016 at www.autotrader.com/car-news/full-color-heads-up-display-to-debut-on-new-3-series-132586.

Uber Details—Online prior to Apr. 13, 2016 at www.wikihow.com/Use-Uber.

Raspberry Pi: How can I detect the direction of a sound—Online prior to Apr. 13, 2016 at www.quora.com/Raspberry-Pi-1/How-can-I-detect-the-direction-of-a-sound.

* cited by examiner

SELF-DRIVING VEHICLE SYSTEMS AND METHODS

BACKGROUND

1. Field

Various embodiments disclosed herein relate to vehicles. Certain embodiments relate to self-driving motorized vehicles.

2. Description of Related Art

Vehicles typically require a driver. The driver is tasked with keeping the vehicle safely on the road while avoiding obstacles. Driver-caused errors cost tens of thousands of lives per year.

Self-driving vehicles have the potential to eliminate driver error, and thereby save tens of thousands of lives every year. Although self-driving vehicles excel under "normal" driving conditions, they struggle with the often unpredictable nature of life. As a result, there is a need for systems and methods that enable self-driving vehicles to cope with non-standard events.

SUMMARY

Self-driving vehicles will save tens of thousands of lives per year. The majority of vehicle-related deaths are caused by driver errors. Tests have shown that self-driving vehicles nearly eliminate self-inflicted accidents (although they are not immune to accidents caused by human drivers of other vehicles). Self-driving vehicles have unlimited attention spans and can process complex sensor data nearly instantaneously. The ability of self-driving vehicles to save lives is so impressive that society has a moral imperative to develop self-driving technology such that it can be widely adopted.

Self-driving vehicles, however, have shortcomings. Although self-driving vehicles excel under "normal" driving conditions, they sometimes struggle with new situations that often would not be overly difficult for a human. Many of the embodiments described herein enable a hybrid approach that leverages the exceptional abilities of self-driving vehicles while soliciting human interaction in select situations. The resulting combination of machine intelligence and human intelligence significantly enlarges the potential of self-driving vehicles in a manner that will enable self-driving vehicles to become widespread much faster than would otherwise be the case.

In some embodiments, a method of using a self-driving vehicle comprises identifying, by the vehicle, a need for a human interaction; sending, by the vehicle (e.g., directly or indirectly) in response to identifying the need, a first wireless communication to a remote computing device; and/or receiving, by the vehicle, the human interaction in response to the first wireless communication. Various embodiments include diverse needs for human interaction and types of human interactions.

In many embodiments, the human interaction can be from a remotely located human (e.g., not located inside the vehicle) or from a human located inside the vehicle (e.g., from a person who was not actively steering the vehicle at the time the vehicle identified the need for human interaction).

In some embodiments, a method of using a self-driving vehicle comprises identifying, by the vehicle, a need for a human interaction; notifying, by the vehicle in response to identifying the need, a human regarding the need; and/or receiving, by the vehicle, the human interaction in response to the notifying.

In embodiments that include elements such as sending, by the vehicle, a first wireless communication to a remote computing device, the vehicle can do these elements of claimed methods by using the vehicle plus by using intermediary communication systems such as wireless networks, cellular networks, telephone networks, Internet systems, servers, cloud computing, remotely located computers, satellite systems, communication systems, and any other suitable means of enabling the vehicle to send communications to a remote computing device. Thus, while the vehicle is used to send wireless communications to the remote computing device, as used herein, the vehicle can use intermediary communication systems to perform claimed method elements. For example, the vehicle may send wireless communications to the remote computing device and/or receive wireless communications from the remote computing device via intermediary communication systems, which can serve as a communication bridge between the vehicle and the remote computing device.

In many embodiments, the vehicle can perform any of the elements autonomously (e.g., without a person located in the car performing the elements even if the car is transporting a passenger).

In some embodiments, identifying the need (for human interaction) comprises detecting, by the vehicle, a person located outside of the vehicle and located within 6 feet of a driver's side window of the vehicle. Detecting by the vehicle can comprise detecting by at least one of a video camera, a microphone system, a proximity sensor, an infrared sensor, a radar detector, and a motion sensor of the vehicle.

In several embodiments, identifying the need (for human interaction) comprises detecting, by the vehicle, a knock on a portion of the vehicle. Detecting by the vehicle can comprise detecting at least one of a sound by a microphone system (of the vehicle) and a vibration by a vibration sensor (of the vehicle). The sound and the vibration can be indicative of a person knocking on the vehicle (e.g., knocking on an exterior of the vehicle, knocking on a glass window of the vehicle, knocking on sheet metal of the vehicle).

In some embodiments, identifying the need (for human interaction) comprises detecting, by a microphone system of the vehicle, an audible voice and determining, by the vehicle, that the audible voice originated from outside the vehicle. Receiving remote human interaction can comprise receiving audio data recorded by a microphone of the remote computing device. The vehicle can comprise a speaker arranged and configured to emit sound outside the vehicle to enable a person located outside the vehicle to hear the sound. Embodiments can also comprise emitting outside the vehicle, by the speaker of the vehicle, the sound based on the audio data; recording, by the microphone system of the vehicle, a verbal response to the sound from the person located outside the vehicle; and/or sending automatically, by the vehicle, a recording of the verbal response to the remote computing device.

In several embodiments, the vehicle further comprises a display screen facing outward such that the person located outside the vehicle can see information on the display screen. Receiving the remote human interaction can comprise receiving a video recorded by a video camera of the remote computing device. Embodiments can comprise showing the video on the display screen facing outward such that the vehicle is configured to enable the person located outside the vehicle to see the video.

In several embodiments, identifying the need (for human interaction) comprises detecting, by a microphone system of the vehicle, an audible voice, and determining, by the vehicle, that the audible voice is greater than a threshold configured to help the vehicle differentiate between background voices and voices directed to the vehicle from a location outside of the vehicle.

In some embodiments, identifying the need (for human interaction) comprises detecting, by a microphone system of the vehicle, an audible voice of a person; determining, by the vehicle, at least one of the audible voice originated outside the vehicle and the person is located outside the vehicle; and/or determining, by the vehicle, that the voice has asked a question. In several embodiments, the vehicle determines that the voice has asked a question by analyzing the words spoken by the voice to identify a question and/or by determining that an intonation of the voice is indicative of a question.

In some embodiments, a microphone system of the vehicle comprises a first microphone and a second microphone spaced apart from the first microphone. Identifying the need (for human interaction) can comprise detecting, by the first and second microphones of the vehicle, an audible voice; comparing, by the vehicle, a first voice signal detected by the first microphone and a second voice signal detected by the second microphone to evaluate a directionality of the voice; and/or determining, by the vehicle, that the directionality is indicative of the voice being directed towards the vehicle.

In several embodiments, the vehicle comprises a speaker arranged and configured to emit a first sound outside the vehicle to enable a person located outside the vehicle to hear the first sound. The vehicle can comprise a first microphone arranged and configured to record a second sound emitted by the person located outside the vehicle. The vehicle can comprise a first video camera arranged and configured to record a first video of an area outside the vehicle. Receiving remote human interaction can comprise receiving audio data recorded by a second microphone of the remote computing device. Embodiments can comprise emitting outside the vehicle, by the speaker of the vehicle, the first sound based on the audio data; recording, by the first microphone of the vehicle, a verbal response from the person located outside the vehicle to the first sound; recording, by the first video camera, the first video of the area outside the vehicle during the verbal response; and/or sending, by the vehicle, the first video and a recording of the verbal response to the remote computing device.

In some embodiments, the vehicle further comprises a display screen facing outward such that the person located outside the vehicle can see information on the display screen. Receiving the remote human interaction can comprise receiving a second video recorded by a second video camera of the remote computing device. Embodiments can comprise showing the second video on the display screen facing outward such that the vehicle is configured to enable the person located outside the vehicle to see the second video.

In several embodiments, the vehicle comprises a video camera and a speaker arranged and configured to emit a first sound and a second sound outside the vehicle to enable a person located outside the vehicle to hear the first and second sounds. Embodiments can comprise initiating a three-way audio communication between the person located outside the vehicle, a first human representative of the vehicle, and a second human representative of the vehicle. The first human representative and the second human representative can be located remotely relative to the vehicle. The remote computing device can be a first remote computing device associated with the first human representative. The second remote computing device can be associated with the second human representative.

In some embodiments, three-way audio communication can comprise receiving, by the vehicle, a first audio data recorded by a microphone of the first remote computing device, and a second audio data recorded by a microphone of the second remote computing device; emitting outside the vehicle, by the speaker of the vehicle, the first sound based on the first audio data; emitting outside the vehicle, by the speaker of the vehicle, the second sound based on the second audio data; and/or recording, by a microphone system of the vehicle, a verbal response from the person located outside the vehicle, and sending a first recording of the verbal response to the first remote computing device and the second remote computing device.

Several embodiments comprise recording, by the microphone system of the vehicle, a verbal request from the person located outside the vehicle, and sending a second recording of the verbal request to the first remote computing device and the second remote computing device. Emitting outside the vehicle, by the speaker of the vehicle, the first sound based on the first audio data can occur in response to the verbal request comprising a first request. Emitting outside the vehicle, by the speaker of the vehicle, the second sound based on the second audio data can occur in response to the verbal request comprising a second request.

In several embodiments, the vehicle comprises a video camera and a speaker arranged and configured to emit sound outside the vehicle to enable a person located outside the vehicle to hear the sound. Identifying the need (for human interaction) can comprise detecting, by the vehicle, a collision of the vehicle. The first wireless communication can comprise a notification regarding the collision and a video of the collision taken by the video camera of the vehicle.

Some embodiments comprise initiating, in response to the detecting the collision, a two-way audio communication between the person located outside the vehicle and a human representative of the vehicle while the human representative is located remotely relative to the vehicle. The two-way audio communication can comprise receiving, by the vehicle, audio data recorded by a microphone of the remote computing device; emitting outside the vehicle, by the speaker of the vehicle, the sound based on the audio data; recording, by a microphone system of the vehicle, a verbal response to the sound from the person located outside the vehicle; and/or sending a recording of the verbal response to the remote computing device.

In several embodiments, identifying the need (for human interaction) comprises at least one of approaching a destination, being within two minutes of arriving at the destination, and arriving at the destination. In response to the identifying the need, some embodiments comprise contacting a representative of the vehicle via the remote computing device and/or prompting the representative to communicate with a person who is at least one of at the destination and representing the destination (e.g., while the representative of the vehicle is located remotely relative to the destination). The person representing the destination can be located at the destination or located remotely relative to the destination. For example, the person representing the destination can be located at a call center that is in a different location than the destination.

In some embodiments, identifying the need (for human interaction) comprises at least one of being within two minutes of arriving at a destination and arriving at the destination. Embodiments can comprise prompting a person at the destination to at least one of load an inanimate object into the vehicle and unload the inanimate object from the vehicle.

In several embodiments, the identifying the need (for human interaction) comprises at least one of approaching a fuel station, being within two minutes of arriving at the fuel station, and arriving at the fuel station. As used herein, a "fuel station" is configured to provide at least one of electricity, hydrogen, natural gas, diesel, petroleum-derived liquids, and/or any other substance suitable to provide energy to enable vehicles to move.

In some embodiments, identifying the need (for human interaction) comprises at least one of approaching a payment station of a parking garage, being within two minutes of arriving at the payment station, and arriving at the payment station. Embodiments can comprise initiating a two-way audio communication between an attendant of the parking garage and a human representative of the vehicle while the human representative is located remotely relative to the vehicle. Embodiments can comprise initiating the two-way audio communication in response to identifying the need for the remote human interaction.

In some embodiments, identifying the need for remote human interaction comprises determining, by the vehicle, that a person is not located in the vehicle. The vehicle can determine that a person is not located in the vehicle using infrared sensors, motion sensors, and/or video cameras.

In several embodiments, identifying the need (for human interaction) comprises detecting, by a sensor of the vehicle, a condition of a road and/or of a road surface, and determining that the condition is potentially hazardous to the vehicle. For example, the road might be blocked, be too narrow, have insufficient overhead clearance, and/or be incomplete. For example, the road surface may be snowy, icy, overly bumpy, have hazardous potholes, and/or have loose gravel. Receiving human interaction can comprise receiving, by the vehicle, an instruction based on input from a human (e.g., who can be located remotely relative to the vehicle). The input can be in response to the condition. The instruction can comprise information regarding how the vehicle should respond to the condition of the road surface.

Instructions can comprise general driving behavior modifications to be applied over an extended period of time (rather than instantaneous modifications such as "turn left 5 degrees right now.") In several embodiments, the general driving behavior modifications apply to vehicle driving over a period of at least sixty seconds and often for at least five minutes.

In some embodiments, identifying the need (for human interaction) comprises identifying, by the vehicle, a discrepancy between an actual road and a road map (e.g., accessible to the vehicle and/or referenced by the vehicle). Receiving the human interaction can comprise receiving, by the vehicle in response to the first wireless communication, an instruction regarding how the vehicle should respond to the discrepancy. The instruction can include the selection of an alternate route.

In several embodiments, identifying the need for the human interaction comprises identifying, by the vehicle, an impasse due to at least one of road conditions and traffic conditions. In several embodiments, identifying the need for the human interaction comprises identifying, by the vehicle, adverse traffic conditions (e.g., that would cause the vehicle to travel at least 35 percent under the road's speed limit). Receiving the remote human interaction can comprise receiving, by the vehicle in response to the first wireless communication, an instruction regarding how the vehicle should respond to the impasse. The instruction can include the selection of an alternate route.

In some embodiments, identifying the need (for human interaction) comprises determining that the vehicle is at least one of within a distance threshold of a potential rider and within a time threshold of arriving at a location of the potential rider.

Several embodiments comprise recording, by a microphone system of the vehicle, a sound emitted by the potential rider; sending a recording of the sound to the remote computing device; and then receiving authorization for the vehicle to transport the potential rider in response to a human hearing the sound via the remote computing device and then authorizing, by the remote computing device, the vehicle to transport the potential rider.

Some embodiments comprise recording, by a camera of the vehicle, a picture showing the potential rider; sending the picture to the remote computing device; and then receiving authorization for the vehicle to transport the potential rider in response to a human seeing the picture and then authorizing, by the remote computing device, the vehicle to transport the potential rider.

In several embodiments, methods of using a self-driving vehicle comprise identifying, by a vehicle management system, a need for a remote human interaction in response to receiving a transportation request from a potential rider; sending, by the vehicle management system in response to identifying the need, a first wireless communication to a remote computing device; and/or receiving, by the vehicle management system, the remote human interaction in response to the first wireless communication.

In some embodiments, the first wireless communication comprises at least one identity indicator of the potential rider. Receiving the remote human interaction can comprise receiving authorization for the vehicle to transport the potential rider in response to a human representative of the vehicle receiving the identity indicator and then authorizing, by the remote computing device, the vehicle to transport the potential rider. The human representative can authorize the vehicle to transport the potential rider in response to receiving, analyzing, verifying, and/or seeing the identity indicator.

In several embodiments, the vehicle comprises a speaker and a microphone system. Embodiments can comprise initiating a two-way audio communication between the potential rider and the human representative in response to at least one of the first wireless communication and the potential rider entering the vehicle.

In some embodiments, the vehicle comprises a camera. Embodiments can comprise taking a picture, by the camera, of the potential rider. The identity indicator can comprise the picture. Embodiments can comprise sending the picture to the remote computing device.

In several embodiments, the vehicle comprises a microphone system. Embodiments can comprise recording, by the microphone system, an audible voice of the potential rider. The identity indicator comprises a recording of the audible voice. Embodiments can comprise sending the recording to the remote computing device.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Self-driving vehicles will save tens of thousands of lives per year. The majority of vehicle-related deaths are caused by driver errors. Tests have shown that self-driving vehicles nearly eliminate self-inflicted accidents (although they are not immune to accidents caused by human drivers of other vehicles).

Self-driving vehicles typically have unlimited attention spans and can process complex sensor data nearly instantaneously. (Alphabet Inc. and Tesla Motors Inc. have built self-driving vehicles.) The ability of self-driving vehicles to save lives is so impressive that society has a moral imperative to develop self-driving technology such that it can be widely adopted.

Self-driving vehicles, however, have shortcomings. Although self-driving vehicles excel under "normal" driving conditions, they sometimes struggle with new situations that often would not be overly difficult for a human. Many of the embodiments described herein enable a hybrid approach that leverages the exceptional abilities of self-driving vehicles while soliciting human interaction in select situations. The resulting combination of machine intelligence and human intelligence significantly enlarges the potential of self-driving vehicles in a manner that will enable self-driving vehicles to become widespread much faster than would otherwise be the case.

Figure 1:
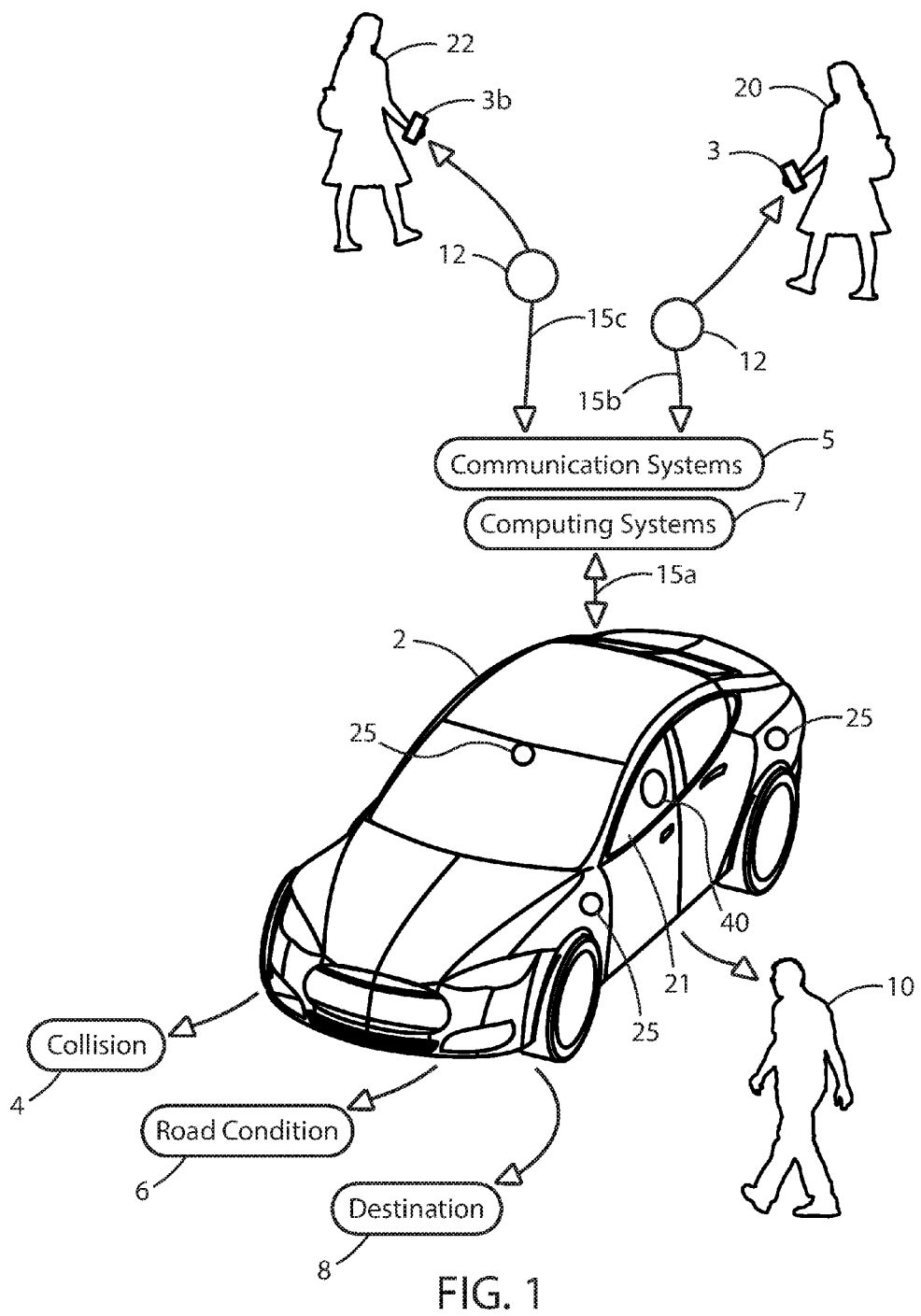
FIG. 1 illustrates a perspective view of a self-driving vehicle, according to some embodiments.

FIG. 1 illustrates a perspective view of a self-driving vehicle 2, which can detect collisions 4, road conditions 6, destinations 8, people 10, and other items. The vehicle 2 can communicate with remote computing devices 3 (e.g., via communication systems 5 and/or via computing systems 7 located remotely relative to the vehicle 2).

In some embodiments, a method of using a self-driving vehicle 2 comprises identifying, by the vehicle 2, a need for a human interaction 12; sending, by the vehicle 2 (e.g., directly or indirectly) in response to identifying the need, a first wireless communication 15a to a remote computing device 3; and/or receiving, by the vehicle 2, the human interaction 12 in response to the first wireless communication 15a. Various embodiments include diverse needs for human interaction 12 and types of human interactions 12.

In many embodiments, the human interaction 12 can be from a remotely located human 20 (e.g., not located inside the vehicle 2) or from a human located inside the vehicle 2 (e.g., from a person who was not actively steering the vehicle 2 at the time the vehicle 2 identified the need for human interaction 12). In some embodiments, a human is located inside the vehicle 2 shown in FIG. 1. In several embodiments, a human is not located inside the vehicle 2 shown in FIG. 1.

In some embodiments, a method of using a self-driving vehicle 2 comprises identifying, by the vehicle 2, a need for a human interaction 12; notifying, by the vehicle 2 in response to identifying the need, a human 20 regarding the need; and/or receiving, by the vehicle 2, the human interaction 12 in response to the notifying.

In embodiments that include elements such as sending, by the vehicle 2, a first wireless communication 15a to a remote computing device 3, the vehicle 2 can perform these elements of claimed methods by using the vehicle 2 plus by using intermediary communication systems 5, 7 such as wireless networks, cellular networks, telephone networks, Internet systems, servers, cloud computing, remotely located computers, satellite systems, communication systems, and any other suitable means of enabling the vehicle 2 to send communications to a remote computing device 3. Thus, while the vehicle 2 is used to send wireless communications 15a to the remote computing device 3, as used herein, the vehicle 2 can use intermediary communication systems 5, 7 to accomplish claimed method elements. For example, the vehicle 2 may send wireless communications 15a to the remote computing device 3 and/or receive wireless communications 15a from the remote computing device 3 via intermediary communication systems 5, 7, which can serve as a communication bridge between the vehicle 2 and the remote computing device 3.

The vehicle can send a wireless communication 15a to the intermediary communication systems 5, 7. Then, the intermediary communication systems 5, 7 can send wireless communications 15b, 15c to remote computing devices 3, 3b (in response to receiving the wireless communication 15a). The intermediary communication systems 5, 7 can also enable the remote computing devices 3, 3b to wirelessly communicate with each other.

The people 20, 22 can see information regarding the vehicle 2 on their computing devices 3, 3b, and then can respond to the information via their computing devices 3, 3b. Their responses can be sent to the vehicle (e.g., wirelessly) via the intermediary communication systems 5, 7.

In many embodiments, the vehicle 2 can perform any of the elements autonomously (e.g., without a person located in the car performing the elements even if the car is transporting a passenger).

Figure 2:
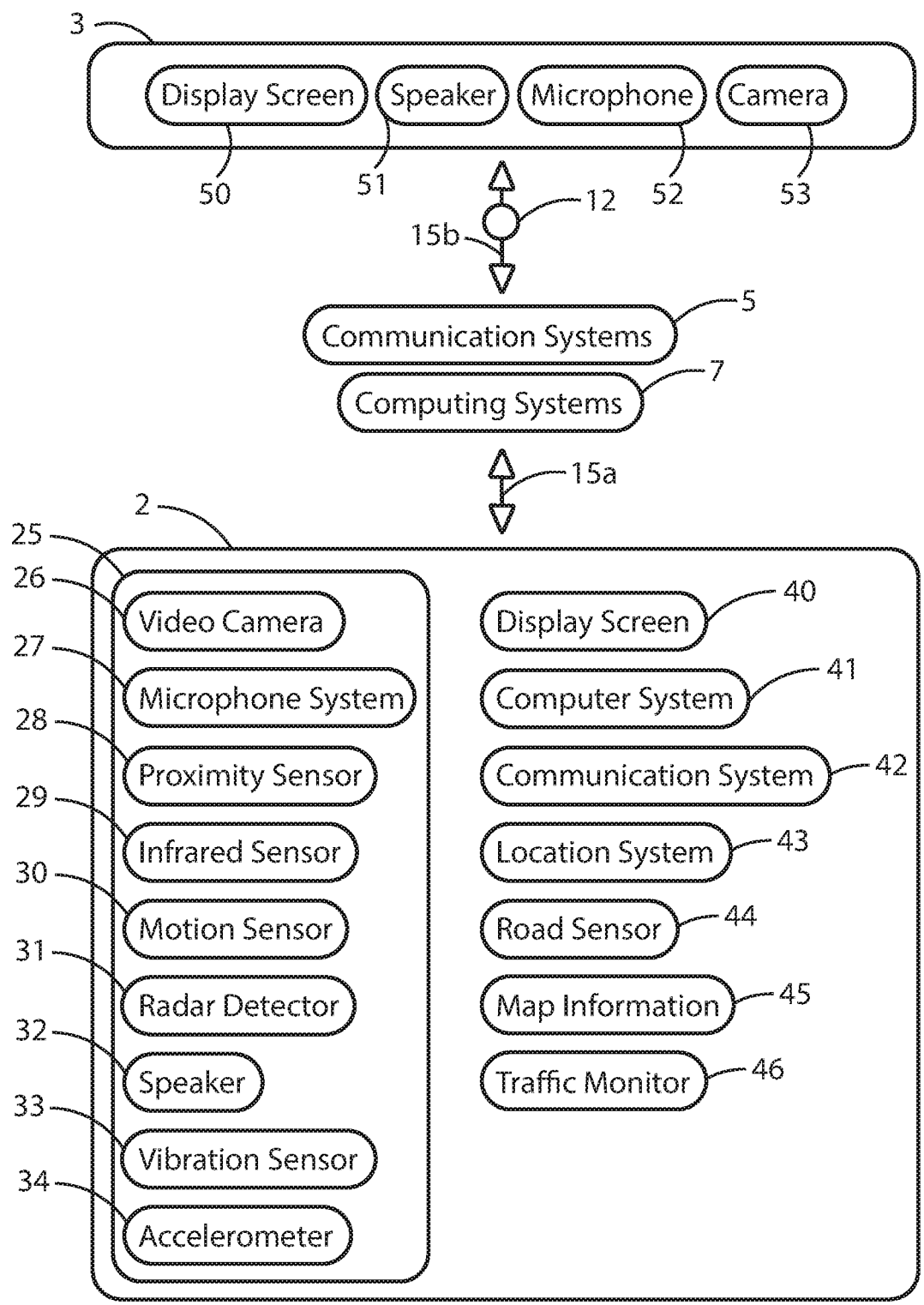
FIG. 2 illustrates a diagrammatic view of the self-driving vehicle shown in FIG. 1, according to some embodiments.

FIG. 2 illustrates a diagrammatic view of a vehicle 2 communicatively coupled to a remote computing device 3. The vehicle 2 can be communicatively coupled to the remote computing device 3 via wireless communication 15a, 15b enabled by communication systems 5 and/or computing systems 7 that are located remotely relative to the vehicle 2.

The remote computing device 3 can be a smartphone, a tablet computer, a laptop computer, a desktop computer, a server, and/or any type of computer that is located remotely relative to the vehicle 2. In some embodiments, the remote computing device is an iPhone made by Apple Inc. or an Android phone based on software made by Alphabet Inc. The remote computing device 3 can comprise a speaker 51 configured to emit sounds, a microphone 52 configured to record sounds, and a display screen 50 configured to display images.

The display screen 50 of the remote computing device 3 can display pictures and videos recorded by a video camera 26 of the vehicle 2. The display screen 40 of the vehicle 2 can display pictures and videos recorded by a video camera 53 of the remote computing device 3.

The vehicle 2 can comprise a sensor and communication module 25. The sensor and communication module 25 can comprise a video camera 26, a microphone system 27, a proximity sensor 28, an infrared sensor 29, a motion sensor 30, a radar detector 31, a speaker 32, a vibration sensor 33, and/or an accelerometer 34.

The video camera 26, the microphone system 27, the proximity sensor 28, the infrared sensor 29, the motion sensor 30, and/or the radar detector 31 can be arranged and configured to detect a person 10 located outside the vehicle 2 and/or located inside the vehicle 2. The computer system 41 can analyze videos (taken by the video camera 26) using machine vision software and techniques to identify a person 10 (shown in FIG. 1) located outside the vehicle 2.

The vibration sensor 33 and/or the accelerometer 34 can be arranged and configured to detect knocks on glass, sheet metal, and/or on any portion of the vehicle 2. For example, a person 10 (shown in FIG. 1) can touch the vehicle 2, which can cause the vehicle 2 to send a notification to the remote computing device 3. The vibration sensor 33 and/or the accelerometer 34 can also be arranged and configured to detect a collision 4 (shown in FIG. 1) of the vehicle 2 hitting an external object, such as another car, a rail, or a tree.

The video camera 26 can be arranged and configured to detect traffic and/or road conditions (e.g., via machine vision). The module 25 and/or the road sensor 44 can comprise a light configured to reflect off a road surface and a light detector that senses the reflected light to analyze road conditions (e.g., ice or water on the road beneath the vehicle 2). In some embodiments, the road sensor 44 comprises a camera 26 facing towards a road to analyze road conditions.

The module 25 can be located inside the vehicle 2 such that the module 25 is arranged and configured to sense and video record people located inside the vehicle 2.

Referring now to FIG. 1, the module 25 can be face outward from the vehicle 2 such that the module 25 is arranged and configured to sense and video record people 10 located outside the vehicle 2. FIG. 1 illustrates several modules 25. The module 25 can face outward through a windshield or other window of the vehicle 2. The module 25 can be located outside the windshield of other window of the vehicle 2. The module 25 can be attached to and/or face outward from a sheet metal portion of the vehicle 2. The module 25 can be attached to and/or face outward from a headlight portion, taillight portion, fog light portion, and/or any other translucent or transparent portion of the vehicle 2.

Referring now to FIG. 2, the vehicle 2 can also comprise a display screen 40, a computer system 41, a communication system 42, a location system 43, a road sensor 44, map and traffic information 45, and a traffic monitoring system 46.

Referring now to FIGS. 1 and 2, the display screen 40 can face outward from the vehicle 2 (as shown in FIG. 1). The display screen 40 can be coupled to any exterior surface of the vehicle 2. In some embodiments, the display screen 40 is integrated into a window (e.g., the driver's side window 21) of the vehicle 2. Thus, a person 10 located outside the window 21 can see information and videos on the display screen 40 in an orientation that is not inverted (e.g., as would be the case if the display screen was oriented for viewing by people located inside the vehicle.

The display screen 40 can be opaque or at least partially transparent or translucent. For example, the display screen 40 can be a BMW Head-Up Display made by Bayerische Motoren Werke AG ("BMW") with the following changes: The display screen 40 can face outwards (rather than inwards towards the driver) such that the display screen 40 is arranged and configured for viewing by a person 10 located outside the vehicle 2 (rather than by the driver of the vehicle 2). The display screen 40 can be coupled to and/or located in a side window (e.g., the driver's side window 21) rather than in the windshield. The display screen 40 can display a streaming video recorded by a remote computing device 3 (rather than display data such as navigation arrows and speed information). The streaming video can show a remotely located representative 20 of the vehicle 2 to a person 10 located outside of the vehicle (e.g., while no person and/or no driver is located in the vehicle 2).

The communication system 42 can be arranged and configured to enable the vehicle 2 to communicate with a remote computing device 3 (e.g., via communication systems 5 and computing systems 7 located remotely relative to the vehicle 2). The communication system 42 can use cellular communication systems and/or Bluetooth communication systems.

The location system 43 can receive location information from Global Positioning Systems (GPS) and/or from location beacons (e.g., iBeacon from Apple Inc.). The location system 43 can also use accelerometers 34 and/or compasses to track distance traveled and/or direction traveled.

The vehicle 2 (e.g., a memory of the vehicle 2) can include map and traffic information 45. The map information can include a layout of roads around the world. The traffic information can be based on historic or approximately real-time traffic data. The traffic data can be sent to the vehicle 2 by communication systems 5 and/or by computing systems 7.

The traffic monitoring system 46 can monitor traffic by the vehicle 2 (e.g., via vehicle sensors and cameras) and can receive traffic information from communication systems 5 and/or by computing systems 7.

The road sensor 44 can monitor the road for ice, snow, water, gravel, potholes, and many other road surface traits. The road sensor 44 can use the camera 26 (for vision recognition of road surface traits). The vehicle 2 can also receive road surface information from communication systems 5 and/or computing systems 7.

Figure 3:
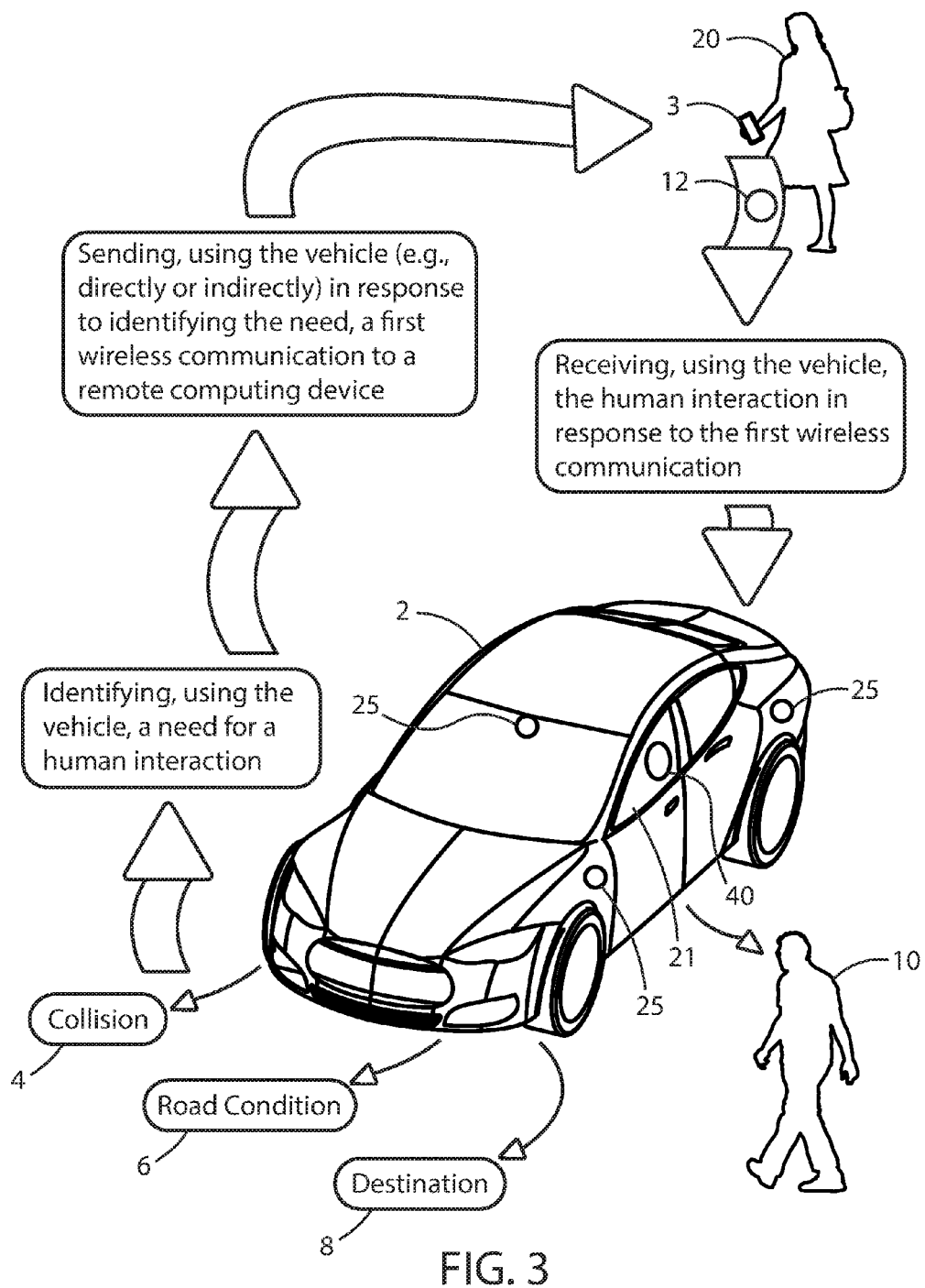
FIGS. 3-5 illustrate diagrammatic views of methods of using the self-driving vehicle shown in FIG. 1, according to some embodiments.

FIG. 3 illustrates a diagrammatic view of methods of using a self-driving vehicle 2, according to some embodiments. Methods can comprise identifying, by the vehicle 2, a need for a human interaction 12. Various needs for human interaction 12 are illustrated in FIG. 13. Additional needs for human interaction 12 are described herein. Needs for human interaction 12 include, but are not limited to collisions 4, hazardous road conditions 6, destination-related situations 8, and people 10 with whom the representative 20 might want to speak.

The vehicle 2 can detect collisions 4 (e.g., using an accelerometer 34 shown in FIG. 2), road conditions 6, and relationships to destinations. For example, the vehicle's location system 43 shown in FIG. 2 can determine the vehicle's current location and the location of the destination via GPS.

The module 25 shown in FIG. 2 can detect people 10 located outside the vehicle 2. The person shown in FIG. 3 can be a person representing a destination, a potential passenger, a gas station attendant, a person seeking to speak with a representative of the vehicle 2 (e.g., because the person's car was in a collision with the vehicle 2), or any other type of person described herein.

Methods of using a self-driving vehicle 2 can comprise sending, by the vehicle 2 (e.g., directly or indirectly) in response to identifying the need, a first wireless communication 15a to a remote computing device 3; and/or receiving, by the vehicle 2, the human interaction 12 in response to the first wireless communication 15a.

People 10 typically expect to find a representative 20 located inside the vehicle 2. This expectation can make life problematic for self-driving vehicles 2. For example, when a police officer pulls a vehicle 2 over, she expects to find a person inside the vehicle 2. Imagine the police officer's surprise when she discovers the vehicle 2 she just pulled over is empty. The police officer might reasonably assume that the representative 20 has fled on foot, which is a very serious crime that in some cases can be punishable by over one year in prison. Enabling the representative 20 of the vehicle 2 to talk with the police officer in response to the police officer pulling the vehicle 2 over can quickly deescalate an otherwise treacherous situation.

There are many situations in which an ability for a remotely located representative 20 of the self-driving vehicle 2 to interact with people 10 located outside the vehicle 2 is extremely advantageous. Thus, there is a need for systems and methods that enable a remotely located representative 20 of the vehicle 2 to interact with people 10 located near the vehicle 2 (e.g., within 30 feet of the vehicle).

Referring now to FIGS. 2 and 3, in some embodiments, identifying the need (for human interaction 12) comprises detecting, by the vehicle 2, a person 10 located outside of the vehicle 2 and located within 6 feet of a driver's side window 21 of the vehicle 2. Detecting by the vehicle 2 can comprise detecting by at least one of a video camera 26, a microphone system 27, a proximity sensor 28, an infrared sensor 29, a radar detector 31, and a motion sensor 30 of the vehicle 2.

In some cases (such as when a police officer pulls the vehicle 2 over), the person 10 might knock on the vehicle 2 in an effort to get the attention of a representative 20 of the vehicle 2. (This is especially true if the person 10 does not realize that there is not a person inside the vehicle 2.)

In several embodiments, identifying the need (for human interaction 12) comprises detecting, by the vehicle 2, a knock on a portion of the vehicle 2. Detecting by the vehicle 2 can comprise detecting at least one of a sound by a microphone system 27 (of the vehicle 2) and a vibration by a vibration sensor 33 (of the vehicle 2). The sound and the vibration can be indicative of a person knocking on the vehicle 2 (e.g., knocking on an exterior of the vehicle 2, knocking on a glass window 21 of the vehicle 2, knocking on sheet metal of the vehicle 2).

In some cases, a person 10 seeking to speak with someone inside the vehicle 2 will speak in the direction of the vehicle 2. Even though a representative 20 might not be in the vehicle 2, the vehicle 2 can look for indicators that the person 10 is seeking to talk with a representative 20 of the vehicle. If the vehicle 2 determines that the odds are above a predetermined threshold that the person 10 is seeking to speak with a representative 20 of the vehicle 2, then the vehicle 2 can send a notification to the remote computing device 3 associated with the representative 20.

In some embodiments, identifying the need (for human interaction 12) comprises detecting, by a microphone system of the vehicle 2, an audible voice (e.g., from the person 10) and determining, by the vehicle 2, that the audible voice originated from outside the vehicle 2. Receiving remote human interaction 12 can comprise receiving audio data recorded by a microphone 52 of the remote computing device 3. The vehicle 2 can comprise a speaker 32 arranged and configured to emit sound outside the vehicle 2 to enable a person 10 located outside the vehicle 2 to hear the sound. Embodiments can also comprise emitting outside the vehicle 2, by the speaker of the vehicle 2, the sound based on the audio data; recording, by the microphone system 27 of the vehicle 2, a verbal response to the sound from the person 10 located outside the vehicle 2; and/or sending automatically, by the vehicle 2, a recording of the verbal response to the remote computing device 3.

In several embodiments, the vehicle 2 further comprises a display screen 40 facing outward such that the person 10 located outside the vehicle 2 can see information on the display screen 40. Receiving the remote human interaction 12 can comprise receiving a video recorded by a video camera 53 of the remote computing device 3. Embodiments can comprise showing the video on the display screen 40 facing outward such that the vehicle 2 is configured to enable the person 10 located outside the vehicle 2 to see the video.

In several embodiments, identifying the need (for human interaction 12) comprises detecting, by a microphone system 27 of the vehicle 2, an audible voice, and determining, by the vehicle 2, that the audible voice is greater than a threshold configured to help the vehicle 2 differentiate between background voices and voices directed to the vehicle 2 from a location outside of the vehicle 2.

In some embodiments, identifying the need (for human interaction 12) comprises detecting, by a microphone system 27 of the vehicle 2, an audible voice of a person; determining, by the vehicle 2, at least one of the audible voice originated outside the vehicle 2 and the person is located outside the vehicle 2; and/or determining, by the vehicle 2, that the voice has asked a question. In several embodiments, the vehicle 2 determines that the voice has asked a question by analyzing the words spoken by the voice to identify a question and/or by determining that an intonation of the voice is indicative of a question.

In some embodiments, a microphone system of the vehicle 2 comprises a first microphone (e.g., of a first module 25) and a second microphone (e.g., of a second module 25). The first module 25 is spaced apart from the second module 25 such that the first and second microphones are spaced apart from each other. As shown in FIG. 3, the vehicle 2 includes multiple modules 25, which each have at least one microphone.

Identifying the need (for human interaction 12) can comprise detecting, by the first and second microphones of the vehicle 2, an audible voice; comparing, by the vehicle 2, a first voice signal detected by the first microphone and a second voice signal detected by the second microphone to evaluate a directionality of the voice; and/or determining, by the vehicle 2, that the directionality is indicative of the voice being directed towards the vehicle 2.

The vehicle 2 can use several factors to determine the directionality of the voice. For example, the vehicle can analyze wave lengths, tones, and time lags of voices. The relationships of these factors can provide indications of the directionality of the voice.

In some embodiments, the vehicle 2 has a first microphone 27 on the front of the vehicle 2, a second microphone 27 on the driver's side of the vehicle 2, a third microphone 27 on the back of the vehicle 2, and a fourth microphone 27 on the passenger's side of the vehicle 2. (As used herein, the passenger's side is opposite the driver's side even though passengers can actually be located in seats in any portion of the vehicle.)

The vehicle 2 acts as an obstruction to sound. Although some sounds pass through the vehicle 2 in an attenuated manner, a voice directed towards the driver's side of the vehicle 2 will be sensed as having a greater magnitude by the second microphone 27 (located on the driver's side) than by the fourth microphone 27 (located on the passenger's side). In many cases, this same voice will also be sensed as having a greater magnitude by the second microphone 27 (located on the driver's side) than by the first microphone 27 (on the front of the vehicle 2) and the third microphone 27 (on the back of the vehicle 2). The greater magnitude sensed by the second microphone 27 (located on the driver's side) can be indicative of the voice being directed towards the vehicle 2.

Time lag can also help the vehicle 2 determine the directionality of the voice. For example, when a person emitting a voice is located near the driver's side of the vehicle 2, the voice directed towards the driver's side of the vehicle 2 will be sensed by the second microphone 27 (located on the driver's side) before being sensed by the fourth microphone 27 (located on the passenger's side).

In some cases, two-way audio communication between the representative 20 and the person 10 (via the vehicle 2) is not as helpful as also including video communication between the representative 20 and the person 10. The video communication can be one-way (e.g., a video recorded by the vehicle 2 is sent to the remote computing device 3) or can be two-way (e.g., a video recorded by the vehicle 2 is sent to the remote computing device 3 and a video recorded by the remote computing device 3 is sent to the vehicle 2 for display on the display screen 40).

In several embodiments, the vehicle 2 comprises a speaker 32 arranged and configured to emit a first sound outside the vehicle 2 to enable a person 10 located outside the vehicle 2 to hear the first sound. The vehicle 2 can comprise a first microphone 27 arranged and configured to record a second sound emitted by the person 10 located outside the vehicle 2. The vehicle 2 can comprise a first video camera 26 arranged and configured to record a first video of an area outside the vehicle 2.

Receiving remote human interaction 12 (by the vehicle 2) can comprise receiving audio data recorded by a second microphone 52 of the remote computing device 3. Embodiments can comprise emitting outside the vehicle 2, by the speaker 32 of the vehicle 2, the first sound based on the audio data; recording, by the first microphone 27 of the vehicle 2, a verbal response from the person 10 located outside the vehicle 2 to the first sound; recording, by the first video camera 26, the first video of the area outside the vehicle 2 during the verbal response; and/or sending, by the vehicle 2, the first video and a recording of the verbal response to the remote computing device 3.

In some embodiments, the vehicle 2 further comprises a display screen 40 facing outward such that the person 10 located outside the vehicle 2 can see information on the display screen 40. Receiving the remote human interaction 12 can comprise receiving a second video recorded by a second video camera 53 of the remote computing device 3. Embodiments can comprise showing the second video on the display screen 40 facing outward such that the vehicle 2 is configured to enable the person 10 located outside the vehicle 2 to see the second video.

Referring now to FIGS. 1 and 2, some vehicles have one, two, three, four, or more representatives 20, 22. In some cases, facilitating communication that comprises multiple representatives 20, 22 is highly beneficial.

For example, if the vehicle 2 is in a collision, one representative 20 might be the owner of the vehicle 2 while the other representative 22 works for an insurance company that provides insurance for the vehicle 2. If the vehicle 2 gets into trouble, one representative 20 might be a minor (e.g., with or without a driver's license) who was controlling the vehicle 2 while the other representative 22 might be an adult guardian of the minor. If the vehicle 2 is a rental vehicle, one representative 20 might be the person who rented the vehicle while the other representative 22 works for the car rental company.

In several embodiments, the vehicle 2 comprises a video camera 26 and a speaker 32 arranged and configured to emit a first sound and a second sound outside the vehicle 2 to enable a person 10 located outside the vehicle 2 to hear the first and second sounds. Embodiments can comprise initiating, by the vehicle 2, a three-way audio communication between the person 10 located outside the vehicle 2, a first human representative 20 of the vehicle 2, and a second human representative 22 of the vehicle 2. The first human representative 20 and the second human representative 22 can be located remotely relative to the vehicle 2. The remote computing device 3 can be a first remote computing device 3 associated with the first human representative 20. A second remote computing device 3b can be associated with the second human representative 22.

In some embodiments, three-way audio communication can comprise receiving, by the vehicle 2, a first audio data recorded by a microphone 52 of the first remote computing device 3, and a second audio data recorded by a microphone of the second remote computing device 3b; emitting outside the vehicle 2, by the speaker 32 of the vehicle 2, the first sound based on the first audio data; emitting outside the vehicle 2, by the speaker 32 of the vehicle 2, the second sound based on the second audio data; and/or recording, by a microphone system 27 of the vehicle 2, a verbal response from the person 10 located outside the vehicle 2, and sending a first recording of the verbal response to the first remote computing device 3 and the second remote computing device 3b.

Several embodiments comprise recording, by the microphone system 27 of the vehicle 2, a verbal request from the person 10 located outside the vehicle 2, and sending a second recording of the verbal request to the first remote computing device 3 and the second remote computing device 3b. Emitting outside the vehicle 2, by the speaker 32 of the vehicle 2, the first sound based on the first audio data can occur in response to the verbal request comprising a first request. Emitting outside the vehicle 2, by the speaker of the vehicle 2, the second sound based on the second audio data can occur in response to the verbal request comprising a second request.

Although self-driving vehicles 2 have dramatically lower collision rates than human-driven vehicles, self-driving vehicles 2 are not immune to collisions (especially due to mistakes by human-driven vehicles). In the event of a collision, human interaction is very beneficial. A representative 20 of the vehicle 2 can talk to the person 10 who was driving the other car in the collision (e.g., to exchange insurance information). The representative 20 of the vehicle 2 can be an owner of the vehicle 2, an insurance agent who manages insurance for the vehicle 2, a lawyer, or any other person suitable to help take steps to resolve the challenges associated with the collision.

In several embodiments, the vehicle 2 comprises a video camera 26 and a speaker 32 arranged and configured to emit sound outside the vehicle 2 to enable a person 10 located outside the vehicle 2 to hear the sound. Identifying the need (for human interaction 12) can comprise detecting, by the vehicle 2, a collision 4 of the vehicle 2. The first wireless communication 15a (sent to the remote computing device 3) can comprise a notification regarding the collision 4 and a video of the collision 4 taken by the video camera 26 of the vehicle 2.

Some embodiments comprise initiating, in response to the detecting the collision 4, a two-way audio communication between the person 10 located outside the vehicle 2 and a human representative 20 of the vehicle 2 while the human representative 20 is located remotely relative to the vehicle 2. The two-way audio communication can comprise receiving, by the vehicle 2, audio data recorded by a microphone 52 of the remote computing device 3; emitting outside the vehicle 2, by the speaker 32 of the vehicle 2, the sound based on the audio data; recording, by a microphone system 27 of the vehicle 2, a verbal response to the sound from the person 10 located outside the vehicle 2; and/or sending a recording of the verbal response to the remote computing device 3.

The vehicle 2 can be traveling towards a destination 8. For example, the destination 8 may be a flower shop or a dry cleaning business. When the vehicle 2 arrives at the business, the representative 20 may want to call someone associated with the business to let her know the vehicle 2 has arrived and/or to ask her to load flowers, clean clothes, or any other item into the vehicle 2. Once the vehicle 2 is loaded, the vehicle 2 can continue to its next destination (which may be its home where the representative 20 is waiting to unload the items from the vehicle 2).

In several embodiments, identifying the need (for human interaction 12) comprises at least one of approaching a destination 8, being within two minutes of arriving at the destination 8, and arriving at the destination 8. In response to the identifying the need, some embodiments comprise contacting a representative 20 of the vehicle 2 via the remote computing device 3 and/or prompting the representative 20 to communicate with a person who is at least one of at the destination 8 and representing the destination 8 (e.g., while the representative 20 of the vehicle 2 is located remotely relative to the destination 8). The person representing the destination 8 can be located at the destination 8 or located remotely relative to the destination 8. For example, the person representing the destination 8 can be located at a call center that is in a different location than the destination 8.

In some embodiments, identifying the need (for human interaction 12) comprises at least one of being within two minutes of arriving at a destination 8 and arriving at the destination 8. Embodiments can comprise prompting a person at the destination 8 to at least one of load an inanimate object into the vehicle 2 and unload the inanimate object from the vehicle 2.

Figure 5:
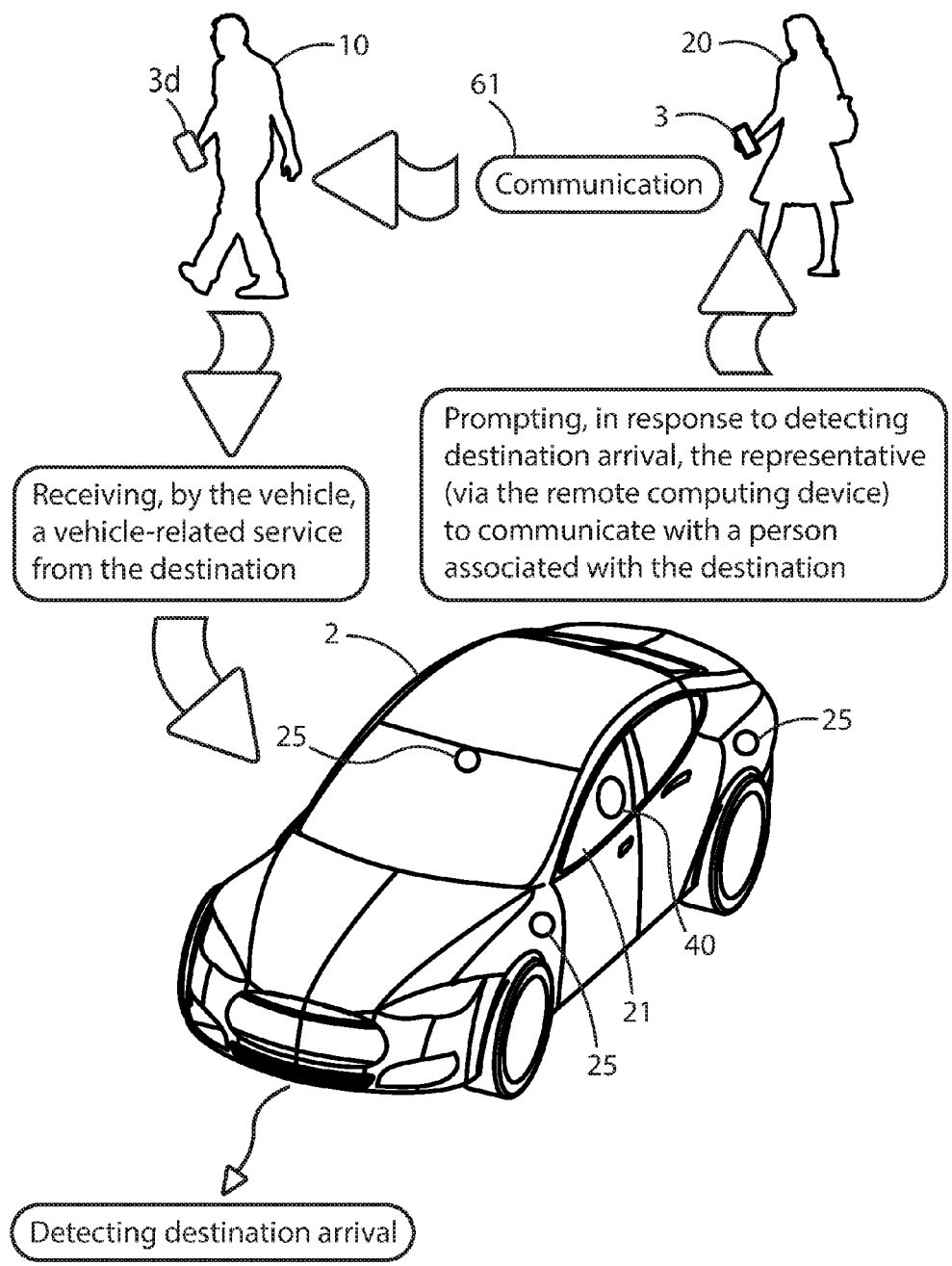

Referring now to FIG. 5, the vehicle 2 can detect that the vehicle is close to the destination, within 10 minutes of arriving at the destination, within 5 minutes of arriving at the destination, within 2 minutes of arriving at the destination, within three miles of the destination, within one mile of the destination, and/or has arrived at the destination. In response to any of these destination-related states, the vehicle 2 can prompt the representative 20 (e.g., via the remote computing device 3) to send a communication 61 (e.g., directly or indirectly) to a computing device 3d (e.g., a telephone, a computer) of a person 10 who is at least one of at the destination 8 and representing the destination 8. The prompt can include information regarding a vehicle-related service (e.g., load the vehicle 2, unload the vehicle 2, service the vehicle 2, add fuel to the vehicle 2, wash the vehicle 2, park the vehicle 2, store the vehicle 2, end a vehicle rental period, return the vehicle 2 to a rental company). Then, the vehicle 2 can receive a vehicle-related service (e.g., from the destination) and/or in response to the prompt and/or in response to the communication 61.

Referring now to FIGS. 1-3 and 5, the vehicle 2 may travel to many different types of destinations 8. In some embodiments, the destination 8 is a fuel station or a parking garage, which often are not setup to handle driverless vehicles.

In several embodiments, the identifying the need (for human interaction 12) comprises at least one of approaching a fuel station, being within two minutes of arriving at the fuel station, and arriving at the fuel station. As used herein, a "fuel station" is configured to provide at least one of electricity, hydrogen, natural gas, diesel, petroleum-derived liquids, and/or any other substance suitable to provide energy to enable vehicle 2s to move.

In some embodiments, identifying the need (for human interaction 12) comprises at least one of approaching a payment station of a parking garage, being within two minutes of arriving at the payment station, and arriving at the payment station. Embodiments can comprise initiating a two-way audio communication between an attendant 10 of the parking garage and a human representative 20 of the vehicle 2 while the human representative is located remotely relative to the vehicle 2. Embodiments can comprise initiating the two-way audio communication in response to identifying the need for the remote human interaction 12.

In some embodiments, identifying the need for remote human interaction 12 comprises determining, by the vehicle 2, that a person is not located in the vehicle 2. The vehicle 2 can determine that a person is not located in the vehicle 2 using infrared sensors 29, motion sensors 30, and/or video cameras 26.

Referring now to FIGS. 1-3, in several embodiments, identifying the need (for human interaction 12) comprises detecting, by a sensor of the vehicle 2, a condition 6 of a road and/or of a road surface, and determining that the condition 6 is potentially hazardous to the vehicle 2. For example, the road might be blocked, be too narrow, have insufficient overhead clearance, and/or be incomplete. For example, the road surface may be snowy, icy, overly bumpy, have hazardous potholes, and/or have loose gravel. Receiving human interaction 12 can comprise receiving, by the vehicle 2, an instruction based on input from a human 20 (e.g., who can be located remotely relative to the vehicle 2). The input can be in response to the condition 6. The instruction can comprise information regarding how the vehicle 2 should respond to the condition 6 of the road surface.

Instructions can comprise general driving behavior modifications to be applied over an extended period of time (rather than instantaneous modifications such as "turn left 5 degrees right now.") In several embodiments, the general driving behavior modifications apply to vehicle 2 driving over a period of at least sixty seconds and often for at least five minutes.

For example, the instruction can tell the vehicle 2 to stop driving through a snowy mountain pass or to driver slower than a posted speed limit due to large potholes.

In some embodiments, identifying the need (for human interaction 12) comprises identifying, by the vehicle 2, a discrepancy between an actual road and a road map (e.g., accessible to the vehicle 2 and/or referenced by the vehicle 2). The actual road can be the road on which the vehicle 2 is driving. The road map can be an electronic map.

Receiving the human interaction 12 can comprise receiving, by the vehicle 2 in response to the first wireless communication 15a, an instruction regarding how the vehicle 2 should respond to the discrepancy. The instruction can include the selection of an alternate route.

In several embodiments, identifying the need for the human interaction 12 comprises identifying, by the vehicle 2, an impasse due to at least one of road conditions and traffic conditions. In several embodiments, identifying the need for the human interaction 12 comprises identifying, by the vehicle 2, adverse traffic conditions (e.g., that would cause the vehicle 2 to travel at least 35 percent under the road's speed limit). Receiving the remote human interaction 12 can comprise receiving, by the vehicle 2 in response to the first wireless communication 15a, an instruction regarding how the vehicle 2 should respond to the impasse. The instruction can include the selection of an alternate route.

A self-driving vehicle 2 can be assigned to pick up passengers even when no driver is present in the vehicle 2. A challenge is that the vehicle 2 may inadvertently pick up the wrong passenger. Remote human interaction helps mitigate this challenge.

The potential rider 10 can send a transportation request 58 (shown in FIG. 4) to any portion of a vehicle management system, which can comprise communication systems 5, computing systems 7, and/or at least one vehicle 2. Any portion of the vehicle management system (e.g., the vehicle 2, the communication system 5, and/or the computing systems 7) can receive the transportation request 58. The potential rider 10 can use a remote computing device 3c (shown in FIG. 4) to send the transportation request 58.

In some embodiments, identifying the need (for human interaction 12) comprises determining that the vehicle 2 is at least one of within a distance threshold of a potential rider 10 and within a time threshold of arriving at a location of the potential rider 10.

In some embodiments, a first module 25 is located inside a passenger area of the vehicle 2 and additional modules 25 face outward from the vehicle 2 (e.g., to record sounds and images outside the vehicle 2).

Figure 4:
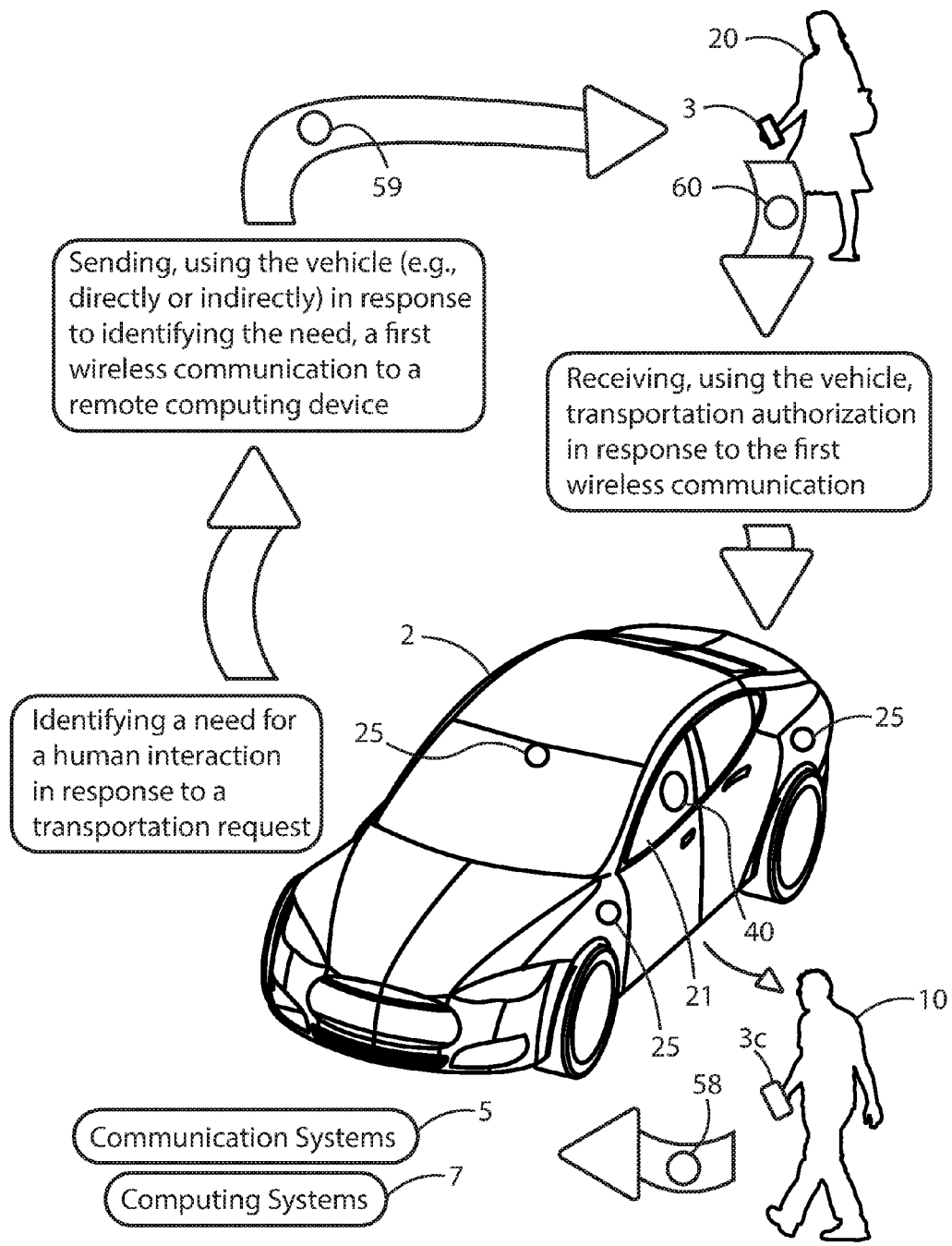

Referring now to FIGS. 2-4, several embodiments comprise recording, by a microphone system 27 of the vehicle 2, a sound emitted by the potential rider 10; sending a recording of the sound to the remote computing device 3; and then receiving authorization 60 for the vehicle 2 to transport the potential rider in response to a human 20 hearing the sound via the remote computing device 3 and then authorizing, by the remote computing device 3, the vehicle 2 to transport the potential rider 10.

Some embodiments comprise recording, by a camera 26 of the vehicle 2, a picture showing the potential rider 10; sending the picture to the remote computing device 3; and then receiving authorization 60 for the vehicle 2 to transport the potential rider 10 in response to a human 20 seeing the picture and then authorizing, by the remote computing device 3, the vehicle 2 to transport the potential rider 10.

A vehicle management system can comprise communication systems 5, computing systems 7, and/or at least one vehicle 2. In several embodiments, methods of using a self-driving vehicle 2 comprise identifying, by a vehicle 2 management system, a need for a remote human interaction 12 in response to receiving a transportation request from a potential rider 10; sending, by the vehicle 2 management system in response to identifying the need, a first wireless communication 15b to a remote computing device 3; and/or receiving, by the vehicle 2 management system, the remote human interaction 12 in response to the first wireless communication 15b.

In some embodiments, the first wireless communication 15b comprises at least one identity indicator 59 of the potential rider 10. Receiving the remote human interaction 12 can comprise receiving authorization 60 for the vehicle 2 to transport the potential rider 10 in response to a human representative 20 of the vehicle 2 receiving the identity indicator 59 and then authorizing, by the remote computing device 3, the vehicle 2 to transport the potential rider 10. The human representative 20 can authorize the vehicle 2 to transport the potential rider in response to receiving, analyzing, verifying, and/or seeing the identity indicator 59.

In several embodiments, the vehicle 2 comprises a speaker 32 and a microphone system 27. Embodiments can comprise initiating a two-way audio communication between the potential rider 10 and the human representative 20 in response to at least one of the first wireless communication 15b and the potential rider entering the vehicle 2.

In some embodiments, the vehicle 2 comprises a camera 26. Embodiments can comprise taking a picture, by the camera 26, of the potential rider 10. The identity indicator 59 can comprise the picture. Embodiments can comprise sending the picture to the remote computing device 3.

In several embodiments, the vehicle 2 comprises a microphone system 27. Embodiments can comprise recording, by the microphone system 27, an audible voice of the potential rider 10. The identity indicator 59 can comprise a recording of the audible voice. Embodiments can comprise sending the recording to the remote computing device 3.

Interpretation None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A method of using a self-driving vehicle, the method comprising:
    detecting, by the vehicle, an audible voice of a person located outside the vehicle;
    sending, in response to detecting the voice, a first wireless communication to a remote computing device;
    receiving, by the vehicle, audio data recorded by a microphone of the remote computing device in response to the first wireless communication;
    emitting outside the vehicle, by a speaker of the vehicle, a sound based on the audio data;
    recording, by a microphone system of the vehicle, a verbal response to the sound from the person located outside the vehicle; and
    sending automatically a recording of the verbal response to the remote computing device.

2. The method of claim 1, wherein the sending the first wireless communication is at least partially in response to detecting, by the vehicle, the person located outside of the vehicle.

3. The method of claim 2, wherein the detecting the person comprises detecting by at least one of a video camera, the microphone system, a proximity sensor, an infrared sensor, a radar detector, and a motion sensor of the vehicle.

4. The method of claim 1, wherein the sending the first wireless communication is at least partially in response to detecting, by the vehicle, a knock on a portion of the vehicle.

5. The method of claim 4, wherein the detecting the knock by the vehicle comprises detecting at least one of a knocking sound by the microphone system and a vibration by a vibration sensor, wherein the knocking sound and the vibration are indicative of knocking on the vehicle.

6. The method of claim 1, further comprising determining, by the vehicle, that the audible voice originated from outside the vehicle.

7. The method of claim 1, further comprising determining, by the vehicle, that the audible voice is greater than a threshold configured to help the vehicle differentiate between background voices and voices directed to the vehicle from a location outside of the vehicle.

8. The method of claim 1, further comprising sending the first wireless communication in response to:
    determining, by the vehicle, at least one of the audible voice originated outside the vehicle and the person is located outside the vehicle; and
    determining, by the vehicle, that the voice has asked a question.

9. The method of claim 1, wherein the microphone system of the vehicle comprises a first microphone and a second microphone spaced apart from the first microphone, the method further comprising:
    detecting, by the first and second microphones of the vehicle, the audible voice;

comparing, by the vehicle, a first voice signal detected by the first microphone and a second voice signal detected by the second microphone to evaluate a directionality of the voice; and determining, by the vehicle, that the directionality is indicative of the voice being directed towards the vehicle.

10. The method of claim 1, wherein the vehicle comprises a first video camera arranged and configured to record a first video of an area outside the vehicle, the method further comprising:

recording, by the first video camera, the first video of the area outside the vehicle during the verbal response; and sending, by the vehicle, the first video to the remote computing device.

11. The method of claim 10, wherein the vehicle further comprises a display screen facing outward such that the person located outside the vehicle can see information on the display screen, the method further comprising receiving a second video recorded by a second video camera of the remote computing device, and showing the second video on the display screen facing outward such that the vehicle is configured to enable the person located outside the vehicle to see the second video.

12. The method of claim 1, further comprising initiating a three-way audio communication between the person located outside the vehicle, a first human representative of the vehicle, and a second human representative of the vehicle, wherein the first human representative and the second human representative are located remotely relative to the vehicle, wherein the remote computing device is a first remote computing device associated with the first human representative, and a second remote computing device is associated with the second human representative, wherein the three-way audio communication comprises receiving, by the vehicle, a first audio data recorded by the microphone of the first remote computing device, and a second audio data recorded by a microphone of the second remote computing device.

13. The method of claim 1, further comprising detecting, by the vehicle, a collision of the vehicle, and initiating, in response to the detecting the collision, a two-way audio communication between the person located outside the vehicle and a human representative of the vehicle while the human representative is located remotely relative to the vehicle.

14. The method of claim 1, further comprising detecting, by a sensor of the vehicle, a condition of a road surface, determining that the condition is potentially hazardous to the vehicle, and receiving, by the vehicle, an instruction based on input from a human located remotely relative to the vehicle, wherein the input is in response to the condition, wherein the instruction comprises information regarding how the vehicle should respond to the condition of the road surface.

15. The method of claim 1, further comprising identifying, by the vehicle, a discrepancy between an actual road and a road map, and receiving, by the vehicle, an instruction regarding how the vehicle should respond to the discrepancy.

16. The method of claim 1, further comprising identifying, by the vehicle, an impasse due to at least one of road conditions and traffic conditions, and receiving, by the vehicle an instruction regarding how the vehicle should respond to the impasse.

17. A method of using a self-driving vehicle, the method comprising:

identifying, by the vehicle, a need for a remote human interaction;

sending, in response to identifying the need, a first wireless communication to a remote computing device;

receiving, by the vehicle, the remote human interaction in response to the first wireless communication, wherein the receiving the remote human interaction comprises receiving a video recorded by a video camera of the remote computing device; and showing the video on a display screen of the vehicle, wherein the display screen faces outward such that the display screen is configured to enable the person located outside the vehicle to see the video.

18. A self-driving vehicle configured to communicate with a remote computing device located outside the vehicle in response to identifying a need for a remote human interaction, the vehicle comprising:

a microphone system configured to detect an audible voice of a person located outside the vehicle;

a first wireless communication sent from the vehicle in response to the vehicle detecting the voice;

audio data recorded by a microphone of the remote computing device in response to the first wireless communication;

a speaker configured to emit a sound outside the vehicle based on the audio data; and a recording of a verbal response to the sound, wherein the verbal response is from the person located outside the vehicle and is recorded by the microphone system of the vehicle.

19. The vehicle of claim 18, further comprising a threshold configured to help the vehicle differentiate between background voices and voices directed to the vehicle from a location outside of the vehicle.

20. The vehicle of claim 18, further comprising a question recognition system configured to facilitate determining, by the vehicle, that the voice has asked a question, wherein the first wireless communication is sent from the vehicle at least partially in response to the determining, by the vehicle, that the voice has asked the question.

21. The vehicle of claim 18, wherein the microphone system of the vehicle comprises a first microphone and a second microphone spaced apart from the first microphone, wherein the first and second microphones are configured to facilitate evaluating a directionality of the voice, wherein the first wireless communication is sent from the vehicle at least partially in response to the directionality of the voice.

22. The vehicle of claim 18, further comprising a video camera configured to detect the person located outside of the vehicle.

23. The vehicle of claim 18, further comprising a proximity sensor configured to detect the person located outside of the vehicle.

24. The vehicle of claim 18, further comprising at least one of an infrared detector and a radar detector configured to detect the person located outside of the vehicle.

25. The vehicle of claim 18, wherein the microphone system is configured to detect a knocking sound indicative of knocking on a portion of the vehicle, wherein the first wireless communication is sent from the vehicle at least partially in response to the detecting the knocking sound.

26. The vehicle of claim 18, further comprising a vibration sensor configured to detect a knock on a portion of the vehicle, wherein the first wireless communication is sent from the vehicle at least partially in response to the detecting the knock.

27. A self-driving vehicle configured to communicate with a remote computing device located outside the vehicle, the vehicle comprising:
- a first video camera configured to record a first video of an area outside the vehicle;
- a first wireless communication sent from the vehicle in response to the vehicle identifying a need for a remote human interaction;
- a second wireless communication received by the vehicle in response to sending the first wireless communication, wherein the second wireless communication comprises audio data recorded by a first microphone of the remote computing device;
- a speaker configured to emit a first sound, wherein the first sound is emitted outside the vehicle to enable a person located outside the vehicle hear the audio data; and
- a third wireless communication and a fourth wireless communication sent from the vehicle to the remote computing device, wherein the third wireless communication comprises a recording of a verbal response to the first sound from the person located outside the vehicle, and the fourth wireless communication comprises the first video of the area outside the vehicle during the verbal response.

28. The vehicle of claim 27, further comprising a second video recorded by the remote computing device, wherein the vehicle comprises a display screen facing outward such that the display screen is configured to show the second video to the person located outside the vehicle.

* * * * *